April 8, 1958
A. W. GERNHARDT
2,829,406
SHELL MOLDING MACHINE
Filed Sept. 8, 1953
3 Sheets-Sheet 1
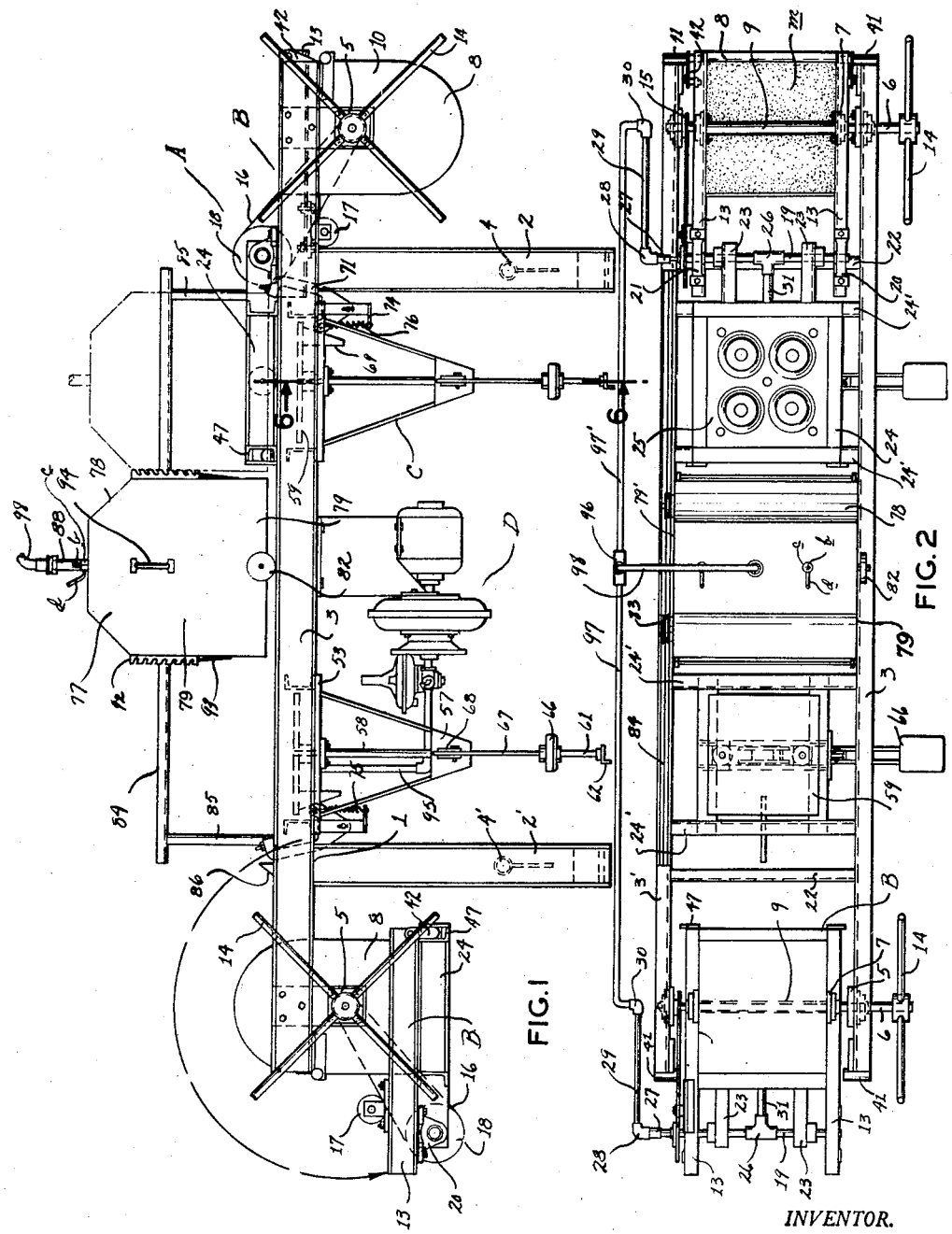
INVENTOR.
ARTHUR W. GERNHARDT
BY
Ralph W. Kalish
ATTORNEY April 8, 1958 — A. W. GERNHARDT — 2,829,406
SHELL MOLDING MACHINE
Filed Sept. 8, 1953 — 3 Sheets-Sheet 2

INVENTOR.
ARTHUR W. GERNHARDT
By Ralph W. Kalish
ATTORNEY

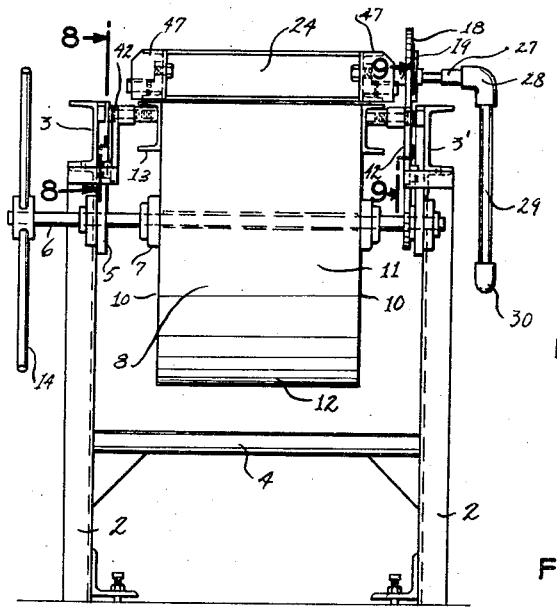
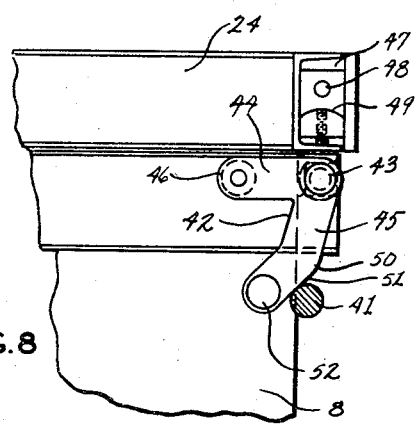
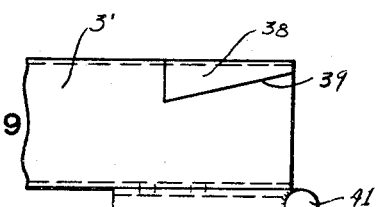
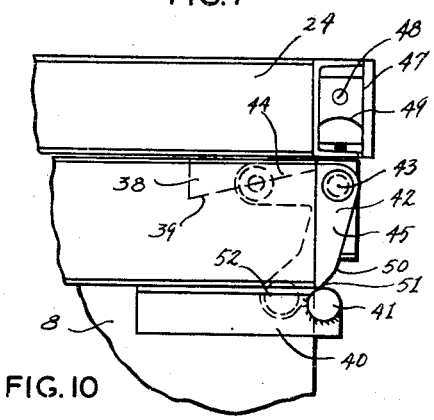
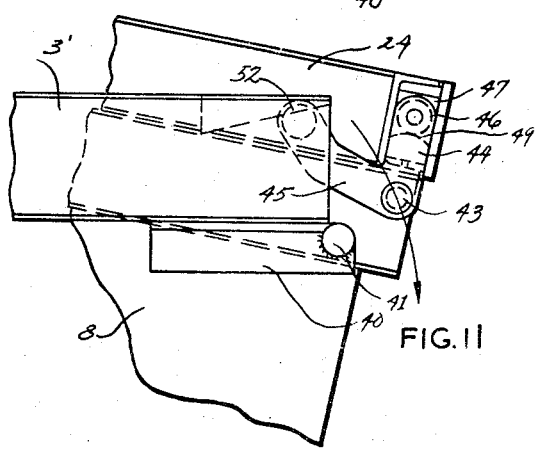
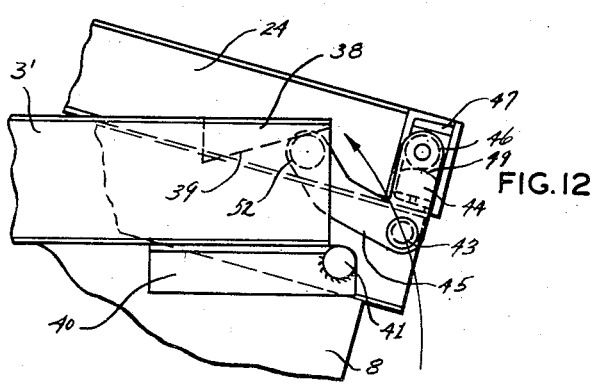

United States Patent Office 2,829,406
Patented Apr. 8, 1958

2,829,406

SHELL MOLDING MACHINE

Arthur W. Gernhardt, St. Louis, Mo., assignor to Tyler Metal Products Company, St. Louis, Mo., a corporation of Missouri Application September 8, 1953, Serial No. 378,987

6 Claims. (Cl. 22—9)

This invention relates in general to sand casting and, more particularly, to a machine for making shell or thin-walled molds of resin-bonded sand.

In recent years there has been developed a process, generally known as the C-process, for the casting of all types of metals and metal alloys in a mold formed of sand and a thermosetting bonding agent. In the production of these molds the investment mixture is applied to a preheated pattern whereon a coating or crust develops, as the heat causes the thermosetting agent to become soft and fused. The coated pattern must then be charged to an oven for curing of the mold, and therein the resin is converted into a hard, insoluble plastic which binds the sand grains strongly together. Subsequent to the oven treatment the mold is stripped from the pattern.

Heretofore, efforts to accomplish the foregoing process have necessitated the preheating of the pattern by placing same within an oven until it arrives at the requisite temperature. The heated pattern must then be drawn from the oven and positioned by attendants for application of the investment mixture thereon. This step must be effected before the heated pattern has lost the requisite temperature. Next the coated pattern has to be transported into a curing oven which must be accomplished in a careful manner to avoid damage to the mold being formed, and then, further handled for positioning for mold ejection. Thus, the currently used process of making shell molds has been appreciably costly in time and labor.

Therefore, it is a primary object of the present invention to provide a shell molding machine which intimately incorporates and mechanically relates a pattern holding frame, continuous pattern heating means, an investment hopper, a curing oven, and mold ejection means in a compact, unitary structure which may be efficiently operated by a single operator in a minimum amount of time with rapid mold production.

A further object of the present invention is to provide a shell molding machine having a movably mounted frame for supporting a pattern plate which may be easily and quickly positioned for receiving the investment mixture, or mold curing, or mold ejection.

A further object of the present invention is to provide a machine of the type stated having a movable pattern frame integrally incorporating a heating unit which moves with the pattern frame and is adapted for uniform and continuous heating of the pattern plate, whereby the maintenance of a constant temperature thereof is effected.

Another object of the present invention is to provide a machine of the type stated having a mobile oven adapted for lengthwise traverse of the machine for optional enclosing disposition with relation to a pattern plate; said oven being provided with means for assuring an even distribution of heat to the mold during the curing procedure.

A still further object of the present invention is to provide a shell molding machine which incorporates novel latch means for reliably clamping the pattern plate to the hopper during the investment step to assure proper discharge thereonto of the molding mixture and to prevent loss of the mixture by inadvertent parting of said plate and hopper.

Another object of the present invention is to provide a shell molding machine having an easily and effectively operated mold ejecting mechanism adapted for actuation by a foot pedal, or other mechanical means.

A further object of the present invention is to provide a shell molding machine which is economically constructed; which is designed to produce molds in a minimum amount of time and at minimum cost; and which machine is most durable in usage.

These and other detailed objects are obtained by the structure illustrated in the accompanying drawings (three sheets), in which—

Figure 1 is an elevational view of a shell molding machine constructed in accordance with and embodying the present invention.

Figure 2 is a top plan view.

Figure 7 is a partial end view showing the pattern frame upon the hopper.

Figure 8 is a vertical transverse section taken on the line 8—8 of Figure 7.

Figure 9 is a vertical transverse section taken on the line 9—9 of Figure 7.

Figures 3, 4, 5, 6:
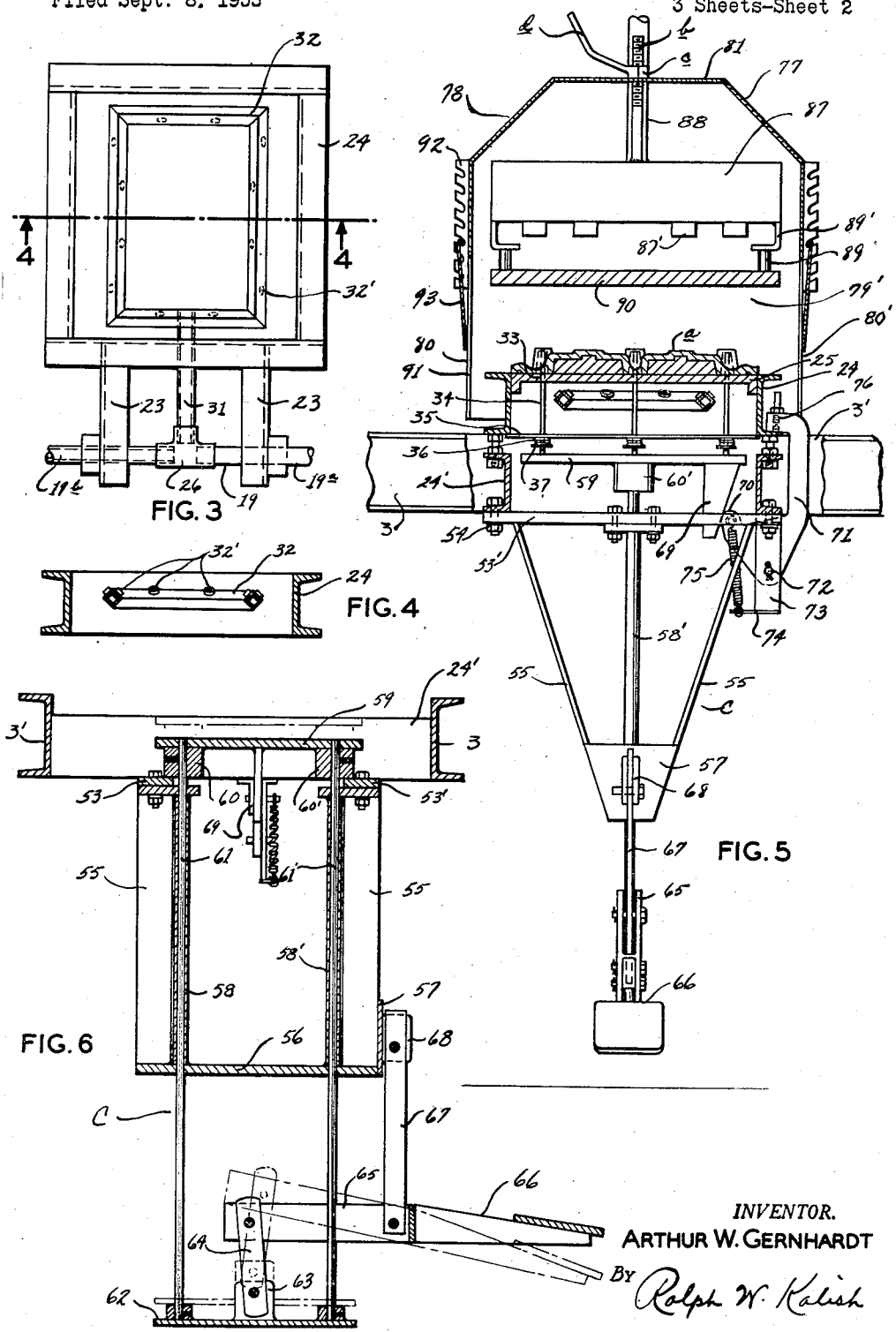
Figure 3 is a plan view of the pattern frame.
Figure 4 is a horizontal transverse section taken on the line 4—4 of Figure 3.
Figure 5 is an enlarged elevation view in partially vertical section, illustrating a mold ejection unit.
Figure 6 is a vertical transverse section taken on the line 6—6 of Figure 1.

Figures 10, 11, and 12 are fragmentary elevation views showing successive positions of the hopper locking device.

Referring now to the drawings which illustrate a preferred embodiment of the present invention, A designates a shell molding machine comprising a main frame 1 having spaced pairs of uprights 2, 2', and a pair of spaced parallel horizontal members 3, 3', secured to uprights at their upper ends and projecting therebeyond; the uprights of each pair being connected by a cross member 4, 4', respectively. Supported from each horizontal member 3, 3', at each of its ends, are downwardly extending, aligned bearing brackets 5 for journaling therethrough of an operating shaft 6 for projection through and journaling in bearings 7 provided in the opposite side walls of a normally open-top investment hopper or "dump" box 8 of a molding assembly B, said shaft 6 extending through a tube 9 suitably secured at its ends to the inner surface of the said opposed walls of hopper 8, which is thereby adapted for rotation by operation of shaft 6, as in a path indicated by an arrow in Figure 1. Since there is a molding assembly B with an adjacent ejector unit C at each end of main frame 1, the following will be restricted, for the sake of simplified description to but one of each of said assemblies.

Investment hopper 8 comprises side walls 10, end walls 11, an arcuate bottom wall 12, and a pair of preferably channel-shaped arms or sections 13 fixedly secured on the opposite lateral walls 10 adjacent the upper open end of said hopper 8 and extending beyond the normally inner end wall 11, lengthwise of the main frame 1. Engaged on one projecting end of shaft 6 is a hand wheel 14 while on the other end immediately inwardly of bearing 5 is a sprocket wheel 15 about which is trained one end of a drive chain 16. One length of said chain 16 is in engagement with an idler gear 17 suitably mounted on one arm 13 for speed reduction purposes, while the opposite end of chain 16 is trained about a relatively larger sprocket wheel 18 mounted on the end of a cross shaft 19 extending transversely of main frame 1 and journaled in spaced pillow block bearings 20, 21, each being mounted upon an arm 13. The rearward or bearing-carrying ends of arms 13 are restingly supported upon a transverse member 22 extending between horizontal main frame members 3, 3', and weldedly secured at its ends thereto.

Engaged upon cross shaft 19 between bearings 20, 21, is one end of a pair of spaced, parallel short arms 23 which at their opposite end are secured, as by welding, to one side of a generally rectangular mold pattern frame 24, normally open at its top and bottom and fabricated preferably of channel sections, the flange portions of which are directed outwardly; said pattern frame 24 being suitably adapted for supporting upon its normally upper end a pattern plate 25 as of iron or steel, and having a uniform cross section. Pattern frame 24 is supported at its end sections by a pair of spaced transverse channel members 24' welded at their ends to horizontal frame members 3, 3'. Said frame 24 is of such depth that the bottom or under surface of pattern plate 25 will be spaced from the lower, normally open end of said frame.

With reference now being made to Figures 2 and 3, it will be seen that shaft 19 is comprised of a preferably solid section 19a and a conduit-forming section 19b which are engaged at their adjacent ends centrally of shaft 19 by a T fitting 26. Conduit-forming section 19b is connected outwardly of sprocket wheel 18 by a nipple 27 and an elbow pipe fitting 28 to a conduit 29 outwardly of main frame 1, and having its opposite end engaged to a universal fitting 30 which is suitably connected to a source of gas, through means presently to be described.

Engaged to T fitting 26 is a short pipe section 31 which extends in axial parallel relation to arm 23, through a suitable opening in the adjacent side of pattern frame 24 for communication on its inner end with a gas burner 32 (Figure 3) disposed completely within pattern frame 24, and of rectangular design, being preferably of box cross section. Burner 32 is provided on its two upwardly presented faces with a plurality of spaced orifices for receiving burner tips 32' which are thus directed toward pattern plate 25 to develop an even and uniform distribution of heat thereover. Temperature control of the heating gas may be readily effected by conventional means, such as a thermostat or valve located within the gas supply line.

Pattern plate 25 is normally formed with a plurality of openings 33 for mold ejector pins 34 (Figure 5) having enlarged, generally frustro-conical heads seated upon pattern plate 25 and with stems projecting downwardly therethrough and through a base plate 35 detachably secured upon the bottom of pattern frame 24. Return springs 36 are mounted upon the projecting portions of each pin 34 and bear at their ends against base plate 35 and a collar 37, mounted on the pin stems, for purposes presently to be discussed. Pattern frame 24, together with pattern plate 25 secured thereon, is swingable, through rotation of shaft 19, from supported position upon main frame 1, as shown at the right hand side of machine A in Figure 1 wherein pattern plate 25 is presented upwardly, to disposition upon the upper open end of hopper 8 preparatory to receiving the investment mixture. In such movement pivoting about nipple 27 will occur whereby connection between conduit 29 and section 19b is maintained. Thus, regardless of the position of pattern frame 24, heating gas may be fed thereto so that pattern plate 25 may be continuously maintained at any desired temperature. By the unique construction herein shown, pattern frame 24 and heating means for the associated pattern plate 25 are integrated into a single unit, thereby obviating the necessity of subjecting a pattern plate to an oven and then while hot transporting to, and securing it upon, a frame, as in molding machines heretofore used.

Hopper 8 is charged with the investment composition m which consists of a dry mix of silica and a thermosetting resin, as of the urea, melamine, furane, or phenolformaldehyde type. A wetting agent may be incorporated in the mix to coact the sand grains for preventing segregation of the same from the resin.

The application of the investment mixture to the pattern plate is accomplished in the following manner: Burner 32 is first ignited to heat said plate to the selected temperature which is customarily around 450° C., and then a parting or mold release agent is sprayed or otherwise applied to the pattern plate 25. An operator, through means of hand wheel 14, rotates shaft 6 with consequent rotation of shaft 19 by operation of drive chain 16 to swing pattern frame 24 with a pattern plate 25 thereon upwardly and thence downwardly upon the open upper end of hopper 8 wherein pattern plate 25 is presented in confronting relation to the dry investment mixture therein. In such swinging action, pivoting about universal fitting 30 will occur whereby conduit 29 will be directed in a reverse direction, as may be seen in the left hand side of Figure 2.

Continued rotation of shaft 6 by the operator will cause pattern frame 24 and hopper 8 to be rotated together in the direction indicated by an arrow at the left hand side of Figure 1, into inverted position. In this position, the investment mixture will, through gravity, drop upon the continuously heated pattern plate 25. That portion of the mixture immediately adjacent plate 25 will, through fusing of the thermosetting resin, form a crust-like film or coating thereon. The coating dwell or length of time of the investment procedure will be dependent upon the temperature of the pattern plate. However, dwell periods are usually in the range of six to twelve seconds depending on the thickness of mold or shell required. At the termination of such interval, the operator will then reversely rotate shaft 6 to return hopper 8 into upright position and further rotation of shaft 6 thereupon will effect return swinging of pattern frame 24 to its original, supported position upon main frame 1, with the mixture-coated pattern plate 25 presented upwardly.

To prevent untoward or premature separation of pattern frame 24 and hopper 8 during the molding step, novel latch means are provided to maintain the same intimately together. Weldedly mounted on each main horizontal member 3, 3', at each end on the inner or hopper-confronting face thereof, is an unlatching bar 38 having an upwardly and outwardly inclined cam surface 39 on its lower face. Secured to the lower edge of each member 3, 3', downwardly of unlatching bar 38 is a support bar 40 extending beyond the end of the associated member 3, 3', and having an inwardly or hopper directed rod-like cam 41 on its outer end, said cam 41 being axially normal to bar 40. Provided for cooperation with said cams 39 and 41 is a latch member 42 which is pivotally mounted at 43 on each side of hopper 8. Latch member 42, which is of general V-shape, comprises relatively short and long arms 44, 45, respectively, with pivot point 43 being at the apex.

Provided on the end of short arm 44 is an inwardly extending roller 46 for engagement within a bracket 47 mounted on pattern frame 24, as by a bolt 48, at each end of the normally inner end thereof, and having a vertically and adjustably positionable rounded surface-forming member 49, for camming relationship with roller 46.

Arm 45, proximate its free end, is angulated as at 50 to provide a cam surface 51 for cooperation with cam 41, and on the end of arm 45 there is mounted an outwardly projecting cam follower 52 for engagement with cam surface 39 on unlatching bar 38.

With reference now being made to Figures 10, 11, and 12, it will be seen that latch 42 will, through gravity assume normally the position shown in Figure 10 wherein arm 45 is directed downwardly with cam surface 51 abutting cam 41. Upon swinging of hopper 8 for movement into inverted position, latch 42 will be swung about its pivot point 43 through the coaction of cams 51, 41, to cause arm 44 to be swung for presenting roller 46 thereon upon rounded surface 49 within bracket 47, as may best be seen in Figure 11, wherein latch 42 is in fully locked position and will maintain such position throughout the continued rotation of hopper 8 and in inverted position, regardless of the length of dwell period. Upon return rotation of hopper 8, to restore same to upright position, cam follower 52 will engage the upper end of cam surface 39 of unlatching bar 38 and the angle of inclination thereof will force arm 44 downwardly causing latch arm 45 to be also directed downwardly and rearwardly whereby latch 42 is swung about pivot 43 in the direction of the arrow in Figure 12 with consequent withdrawal of roller 46 from locked position within bracket 47. As hopper 8, with pattern frame 24, thereon arrives at upright position, latch 42 will complete its pivoting, through gravity, into inoperative position as shown in Figure 10.

Supported upon main frame 1 for disposition beneath pattern frame 24, when the latter is in supported position upon transverse members 24' is a mold stripping or ejector device C having a frame suspended from members 24' and comprising a pair of spaced longitudinal members 53, 53', bolted at their ends, as at 54, to the lower channels of members 24'. Secured at their upper ends to members 53, 53', are downwardly and inwardly extending braces 55 which converge at their lower ends for rigid securement to a relatively narrow transverse bar 56. The pair of braces adjacent either end of bar 56 is rigidified by engagement to gusset plates 57. Supported upon bar 56 is a pair of spaced apart, vertically presented, tubular guides 58, 58', the upper ends of which are connected, as by welding to longitudinal members 53, 53', respectively. Presented for reciprocal vertical movement between frame transverse members 24' is an ejector plate 59, to the under surface of which are fixedly engaged a pair of collars 60, 60', for receiving the upper ends of rods 61, 61', which extend downwardly and freely through guide tubes 58, 58'. At their lower projecting ends rods 61, 61', are secured, as within collars, to a narrow base plate 62. Intermediate rods 61, 61', there is provided upon base plate 62 a pair of spaced, transverse mounting lugs 63 for reception therebetween, and engagement to, the lower end of a relatively short link 64, the upper end of which is pivotally secured on its opposite sides to the legs 65 of a yoke-type foot lever 66. Intermediate its length, outwardly of base plate 62, foot lever 66 is engaged to the lower end of a fulcrum-forming link 67, which is secured at its upper end between opposed lugs 68 projecting from the adjacent gusset plate 57. Upon applying downward pressure to the outer end of lever 66, the same will be pivoted about the lower end of link 67 causing base plate 62 to be carried upwardly with the rods 61, 61', moving through tubes 58, 58', to effect elevation of ejector plate 59.

Affixed to the under side of ejector plate 59 is a vertically inclined cam 69 for engagement with a cam follower 70 provided on the lower end of a generally hook or C-shaped latch arm 71. Said latch arm 71 is pivotally mounted at its lower extremity, as at 72, to spaced upstanding lugs 73 carried on a support plate 74 secured to main framing elements. Engaged to latch 71 adjacent cam follower 70 is the upper end of an extension spring 75 having its lower end connected to support plate 74 for biasing the lower end of latch 71 downwardly for presentation of the upper arcuate end upon the lower flange of the adjacent side of pattern frame 24 to maintain same against inadvertent movement during operation of ejector C. The upper end of latch 71 may be tapped for receiving a stop screw 76 for adjustment purposes.

When ejector plate 59 is in lowered or inoperative position, the upper, wider portion of cam 69 will engage cam follower 70 causing the upper part of latch 71 to be canted out of contact with the adjacent lower flange of pattern frame 24, as may be seen in Figure 1. Upon elevation of ejector plate 59 on operation of foot lever 66, cam 69 will be carried upwardly to allow cam follower 70 to be swung under influence of spring 75 with consequent pivoting of latch 71 into substantially upright position (see Figure 5) wherein it lockingly engages pattern frame 24 to hold same in position during mold ejection.

Presented for normal disposition between the ejector devices C is a mobile oven 77 having a hood 78 having side walls 79, 79', end walls 80, 80', and a top wall 81. Engaged upon side wall 79 adjacent its bottom margin is a roller 82 for traverse along the upper flange of the adjacent horizontal member 3 and rotatably mounted on side wall 79', upwardly of the lower margin thereof, are spaced apart rollers 83 having a V-shaped periphery for movement along a complementarily formed track 84 supported by spaced short uprights 85 in elevated, parallel relation to horizontal member 3', said track 84 extending substantially the distance between transverse members 22, with stops 86 being welded to horizontal member 3. The location of roller 83 prevents same from being subject to expansion under heat emanating from oven 77 so that the same will remain permanently engaged on elevated track 84 for constant, smooth mobility. Furthermore, the two-level support of oven 77, by horizontal member 3 and tarck 84, negates the possibility of tilting or otherwise upsetting said oven. Interiorly, at its upper end, oven 77 is provided with a gas burner having a combustion chamber 87 and burner tips 87', with which communicates a gas inlet conduit 88 extending freely through top wall 81. Supported by spacers 89 and brackets 89' secured to chamber 87 is a heating plate 90 of iron, steel or the like disposed immediately beneath chamber 87 for even distribution of heat therefrom by radiation. Rigidly engaged at their lower ends to the upper surface of the gas burner is a pair of spaced screw members $b$, which project at their upper ends through openings in oven top wall 81. Threaded on the upper projecting ends of each screw member $b$ is a cooperating nut $c$ having an integrally formed, outwardly extending handle $d$. By operation of nuts $c$ through handles $d$, the gas burner together with radiation plate 90 may be selectively lowered or raised within oven 77 whereby control of the intensity of the heat applied to mold $a$ is controlled. During vertical movement of gas burner, conduit 88 moves freely through the opening in top wall 81. The adjustment of the oven heating means, as just described, permits a regulation conducive to uniform curing of mold $a$ which regulation cannot be procured by merely a change of temperature. Oven end walls 80, 80', are open in their lower portions, as at 91, and upwardly thereof are provided with vertical racks 92 for adjustable support of door panels 93. To effect convenient traversing movement of oven 77, an insulated handle 94 is mounted on side walls 79.

Suitably suspended from the frame of machine A, intermediate ejector units C, is a gas mixing unit indicated generally at D having a gas inlet pipe 95 leading from a source of gas and an outlet pipe which connects with a cross fitting 96. Secured to opposite sides of cross fitting 96 are conduits 97, 97', which are connected at their opposite ends to universal fittings 30 for supplying mixed gas to pattern plate burners 32. Leading upwardly from fitting 96 is a flexible pipe 98 for engagement with the inlet conduit 88 to oven 77. Gas mixing unit D assures that the fuel supplied to pattern plate burners 32 and oven 77 is mixed with the appropriate degree of oxygen to assure continuous combustion. Gas is introduced into mixing uint D through pipe 95 and being mixed therein is led to the burners through outlet pipe and fitting 96.

After pattern frame 24 has been returned to resting position with the crust-like coating thereon, the operator will move oven 77 along horizontal member 3, and elevated track 84 into covering disposition about the exposed pattern plate 25 as may best be seen in Figure 5 for curing purposes. The oven heat which will usually be in the neighborhood of 1000° F. causes the thermosetting resin to polymerize and form a three-dimensional hard, infusible mass with the sand tightly held therein, to complete the formation of the mold. The time necessary for effecting the curing operation will depend upon the oven temperature. However, a limited interval of forty to forty-five seconds has been generally found adequate.

Oven door panels 93 may be selectively suspended from racks 92 so that the lower edges thereof may serve as agents for evening of the investment coating on pattern plate 25 whereby excess material is sheared away, as oven 77 moves across said plate. This step results in uniform thickness of the molds formed by machine A to facilitate ultimate use thereof, as well as increases the efficiency of the curing operation since heat is not wasted in penetrating surplus material.

Subsequent to termination of the curing operation, the operator returns oven 77 to its original position and thereupon actuates foot lever 66 whereupon ejector plate 59 is moved upwardly and engages the lower ends of ejector pins 34 pushing same upwardly in loading return springs 36. This action causes pins 34 to move through openings 33 in pattern plate 25 and raise the finished, still hot mold *a*. The operator quickly removes the finished mold *a* and releases lever 66 whereupon, on lowering of ejector plate 59, ejector pins 34 will be restored to initial position through action of return springs 36.

By the unique construction of machine A, the mold forming operation may be accomplished most speedily since the molding assembly B, the molding ejection unit C and oven 77 are all compactly related. The pattern frame 24 is so disposed as to be presented, when in supported position upon main frame 1, for curing operation and mold ejection. By merely swinging of pattern frame 24, the same is readily disposed upon hopper 8 for rotation therewith to accomplish the investment procedure efficiently and quickly.

Machine A, having a mold assembly B at each end with an associated ejection unit C is adapted for high production operation since the mobile oven 77 may be curing one pattern plate while the other is being subjected to the investment mixture. Thus, a single readily shiftable oven can service both ends of the machine A. Heretofore, the pattern plates have had to be transported to an oven for curing. Such procedure has taken considerable time and labor, which is obviated by the present invention, since in this case the oven is brought to the pattern plate. With the present invention, minimum handling is required by operators and the same may remain substantially in one position throughout the complete mold making procedure.

The details of construction can be varied without departing from the spirit of the invention and the exclusive use of those modifications coming within the scope of the claims contemplated.

What is claimed is:

1. A mold forming machine comprising a frame, a first shaft journaled in said frame, an open-top hopper for molding material mounted on said shaft for rotation therewith, a second shaft rotatably mounted on the upper portion of said hopper, said second shaft containing a conduit portion, a source of heating fluid being connected to said conduit portion, a pattern plate-holding frame mounted on said second shaft for movement between inoperative or outward position and operative disposition upon the open-top of said hopper to present a pattern plate carried thereby in confronting relation to the molding material, a burner mounted in said pattern plate-holding frame for movement therewith to heat the pattern plate, said burner being connected to said second shaft conduit portion, and drive means connecting said first and second shafts whereby upon rotation of said first shaft said pattern plate-holding frame will first be swung into operative position and then the same and the hopper will be rotated as a unit into inverted position wherein mold material will fall coveringly upon the pattern plate.

2. A mold forming machine as described in claim 1 wherein the conduit portion of the second shaft is connected to the source of heating fluid through a swingable pipe section movable consequent to swinging of the pattern plate-holding frame, and the burner is adapted to burn gaseous fuel.

3. A mold forming machine as described in claim 1 wherein the burner is adapted to burn gaseous fuel, being of rectangular shape and having inclined upwardly presented faces with a plurality of orifices therein for uniform and continuous heating of a pattern plate carried by said pattern plate-holding frame.

4. A mold forming machine comprising a frame, a first shaft journaled in said frame, an open-top hopper for molding material mounted on said shaft for rotation therewith, a second shaft rotatably mounted on the upper portion of said hopper, a pattern plate-holding frame mounted on said second shaft for movement between inoperative or outward position and operative disposition upon the open-top of said hopper to present a pattern plate carried thereby in confronting relation to the molding material, drive means connecting said first and second shafts whereby upon rotation of said first shaft said pattern plate-holding frame will first be swung into operative position and then the same and the hopper will be rotated as a unit into inverted position wherein mold material will fall coveringly upon the pattern plate, a latch member pivotally mounted on said hopper, a cooperating latch member mounted on said pattern plate-holding frame, and means mounted on said frame for actuating locking engagement of said latch members as the hopper and pattern plate-holding frame are rotated into inverted position and for effecting unlocking thereof when said hopper and pattern plate-holding frame return to initial position.

5. A mold forming machine comprising a main frame, an open-top hopper for molding material rotatably mounted on said frame, a tubular shaft mounted on the upper portion of said hopper, a pattern plate-holding frame swingably mounted on said tubular shaft for movement between disposition coveringly upon the open top of said hopper to present a pattern plate carried thereby in confronting relation to the molding material and supported disposition upon said main frame wherein the pattern plate is exposed, said tubular shaft being connected to a source of fuel and a burner rigidly mounted in said pattern plate-holding frame for swingable movement therewith to continuously maintain a pattern plate carried thereby at a preselected temperature there being means communicatingly connecting said burner and the tubular shaft.

6. A mold forming machine comprising a main frame, an open-top hopper for molding material rotatably mounted on said frame, a tubular shaft mounted on the upper portion of said hopper, a pattern plate, a rectangular box-like pattern frame having an open top for disposition thereacross of the pattern plate, said pattern frame being swingably mounted on tubular shaft for movement between supported dispostion upon the margins of the open top of said hopper to present the pattern plate in confronting relation to the molding material and supported disposition upon said main frame wherein said pattern plate is presented upwardly, said tubular shaft being connected to a source of gaseous fuel, and a gas burner rigidly mounted within the pattern frame for swingable movement therewith and having a plurality of orifices for directing heat against the under surface of the pattern plate there being a fitting connecting said burner and the tubular shaft.

References Cited in the file of this patent

UNITED STATES PATENTS

| 854,932 | Dages | May 28, 1907 |
| 891,508 | Tabor | June 23, 1908 |
| 2,659,107 | DeBell | Nov. 17, 1953 |
| 2,659,944 | Valyi | Nov. 24, 1953 |
| 2,762,092 | Klamp et al. | Sept. 11, 1956 |
| 2,798,265 | Rubovitz et al. | July 9, 1957 |

FOREIGN PATENTS

| 674,421 | Great Britain | June 25, 1952 |
| 832,936 | Germany | Mar. 3, 1952 |

OTHER REFERENCES

The Iron Age, November 15, 1951, pages 111–116.